United States Patent [19]
Tuckey

[11] Patent Number: 5,452,701
[45] Date of Patent: Sep. 26, 1995

[54] TURBINE FUEL PUMP WITH FUEL JET

[75] Inventor: Charles H. Tuckey, Cass City, Mich.

[73] Assignee: Walbro Corporation, Cass City, Mich.

[21] Appl. No.: 247,560

[22] Filed: May 23, 1994

[51] Int. Cl.$^6$ .................................................. F02M 37/04
[52] U.S. Cl. .............................................. 123/509; 417/83
[58] Field of Search .................................... 123/509, 510, 123/514; 417/80, 83, 84, 423.3

[56] References Cited

U.S. PATENT DOCUMENTS

| | | | |
|---|---|---|---|
| 4,834,132 | 5/1989 | Sasaki et al. | 123/514 |
| 4,838,307 | 6/1989 | Sasaki et al. | 123/514 |
| 4,860,714 | 8/1989 | Bucci | 123/514 |
| 4,878,518 | 11/1989 | Tuckey | 123/510 |
| 4,911,134 | 3/1990 | Olsson | 123/509 |
| 5,036,822 | 8/1991 | Kojima | 123/509 |
| 5,070,849 | 12/1991 | Rich et al. | 123/509 |
| 5,139,000 | 8/1992 | Sawert | 123/516 |
| 5,218,942 | 6/1993 | Coha et al. | 123/514 |
| 5,257,916 | 11/1993 | Tuckey | 417/423 |
| 5,289,810 | 3/1994 | Bauer et al. | 123/510 |
| 5,330,475 | 7/1994 | Woodward et al. | 123/509 |

*Primary Examiner*—Thomas N. Moulis
*Attorney, Agent, or Firm*—Barnes, Kisselle, Raisch, Choate, Whittemore & Hulbert

[57] ABSTRACT

An electrically operated fuel pump for automotive vehicles which utilizes a turbine pump rotor operating in an annular pumping channel having circumferentially spaced inlet and outlet ports. The pumping channel has opposed sides with a circumferential array of radially curved grooves axially opposed to the periphery of the impeller and extending radially inwardly from the impeller vanes. The pump has a main outlet leading to the engine to be supplied with fuel. A secondary outlet leads to a fuel jet positioned to direct fuel into a venturi passage to draw fuel from a pump inlet and discharge it into a reservoir in a main fuel tank, the pump being located in the reservoir. A biased valve in the secondary outlet opens when the pump outlet pressure reaches a predetermined pressure to insure adequate fuel flow to the engine upon cold start conditions before fuel is drawn by the jet and venturi and delivered to the reservoir.

15 Claims, 2 Drawing Sheets

TURBINE FUEL PUMP WITH FUEL JET

FIELD OF INVENTION

A fuel system for internal combustion engines with a main fuel tank, an in-tank reservoir and a turbine pump and a side jet.

BACKGROUND OF INVENTION

In the furnishing of fuel to an engine, it has been the practice to use positive displacement pumps to pick up fuel from a tank and deliver it to the fuel rail and fuel injectors of an engine. Vane pumps and gear rotor pumps have been used and these pumps generate substantial pull at the inlet as well as a positive outlet pressure. Side fuel jets have been associated with these pumps to bleed off some of the pump outlet and direct it to a combined jet and venturi. This venturi will pull fuel from the main fuel tank and direct it to an in-tank reservoir for holding reserve fuel. In some instances, a fuel system would have a return line controlled by a pressure regulator to direct excessive fuel to an in-tank reservoir. More recently, with the advent of pressure responsive pumps to control pump speed, the return line was not necessary. However, it was still important to get fuel into the reservoir and the side jet venturi became useful to do this. See jet disclosure in U.S. Pat. No. 4,860,714 issued Aug. 29, 1989.

The very nature of positive displacement pumps resulted in a certain noise factor when operating. Since these pumps are located in the main fuel tank at the rear of a vehicle, the noise could be transmitted to the passenger compartment. A new type of pump became useful in the form of a rotary turbine pump. The rotor, having vanes at the periphery, rotates in an annular chamber, and fuel is pulled in at an inlet section and discharged at a circumferentially spaced outlet area.

SUMMARY OF THE INVENTION

One disadvantage of the turbine pump has been that, upon cold start, there is low voltage applied to the pump and low output pressure from the pump. When used with a side jet venturi, as was customary with the positive displacement pumps, the fuel delivery to the engine was not up to a desirable level. It is an object of this invention to provide a time delay period upon cold start-up, which will block flow to the side jet venturi for a predetermined time, thus allowing full pump delivery of an adequate fuel supply to the engine until voltage has reached a normal operating level.

Another object of the invention lies in the design of the turbine pump housing and side jet venturi to insure restoration of fuel delivery after a main fuel tank and reservoir have been drained of fuel; in other words, the vehicle has run out of gas. Usually, when this happens, the operator gets a small amount of gas at a station and pours it into the gas tank. This provides a low level of fuel in the tank, perhaps ¾". It is essential that a turbine pump be able to pick-up this low level of fuel enough to start the engine and get to a gas station. Thus, the invention is directed to a low profile pump base which locates the pump inlets close to the tank base.

A turbine pump, located in an in-tank reservoir of a vehicle fuel tank, has a main pump outlet for the fuel rail of an engine. A side-jet venturi is associated with the main pump and the jet receives fuel under pressure from the turbine pump through a shunt passage. A biased valve in the shunt passage blocks flow from the turbine pump until the pump outlet reaches a predetermined pressure, thus insuring full pump outlet flow to the engine until such pressure is reached. The base of the pump and the pump inlets are designed with a low profile to insure fuel pick-up with a low fuel level in the main tank.

BRIEF DESCRIPTION OF THE DRAWINGS

The above recited objects of the invention and other objects, features and advantages of the invention will be apparent in the following detailed description of the preferred embodiment and best mode, appended claims, and accompanying drawings in which:

DETAILED DESCRIPTION

Figure 1:
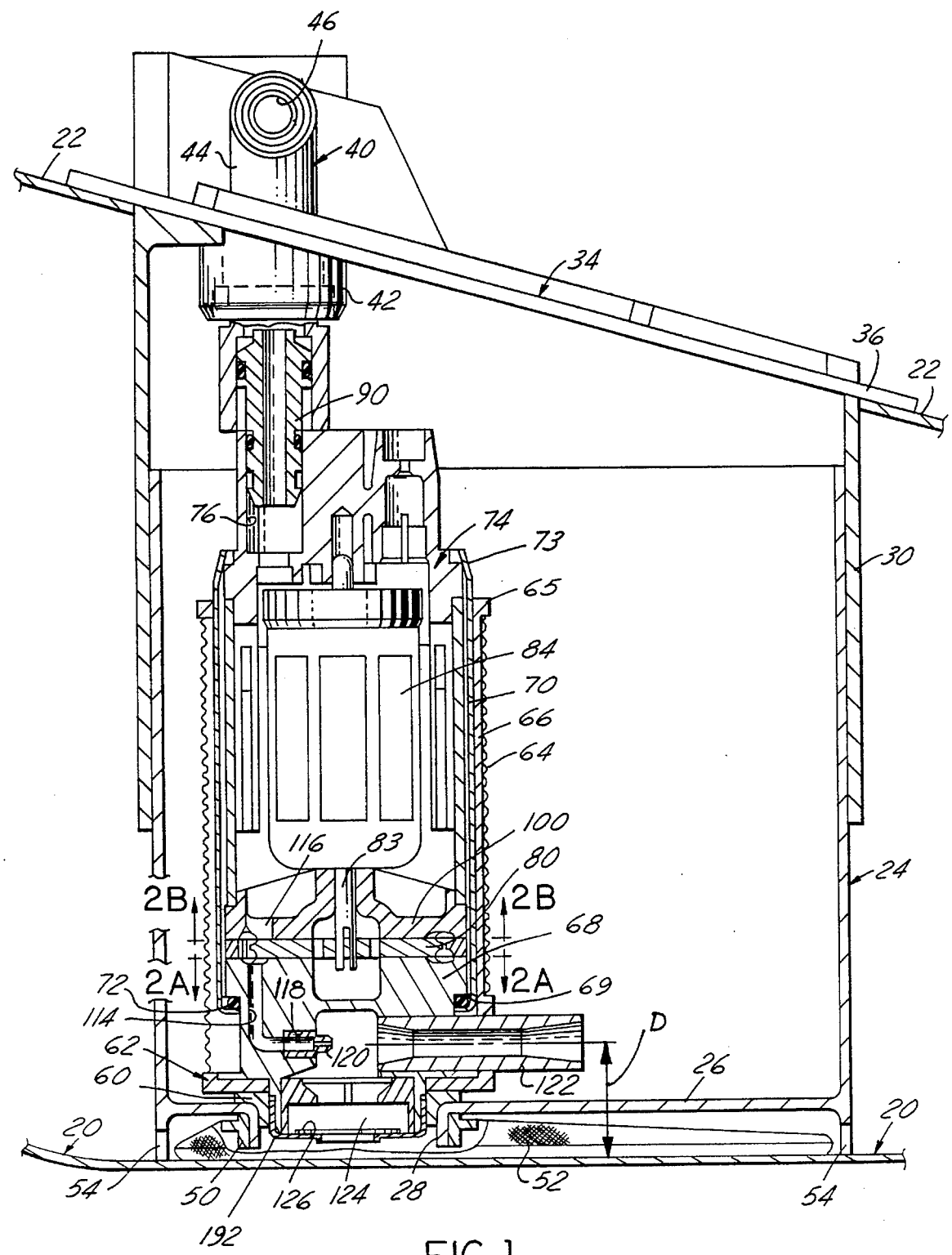
FIG. 1 is a vertical sectional view of a fuel tank and in-tank reservoir with a turbine pump and side jet.

With reference to the drawings, FIG. 1 shows an elevation partially in section, of a main fuel tank having a bottom wall 20 and a top wall 22. An in-tank reservoir is formed of a base housing 24 resting on the bottom 20 and having a raised bottom wall 26 with a flanged opening 28. A top housing 30 has an angled closure 34 with an extending flange 36 and has a telescoping relation with bottom wall 24. The top closure 34 has an integral outlet fixture 40 with a depending portion 42 and an uptanding portion 44. A pump outlet passage in this fixture terminates in an outlet port 46.

The telescoping housings 24 and 34 form what is termed an "in-tank" reservoir and within this reservoir is an electrically powered turbine pump. U.S. Pat. No. 5,257,916 of C. H. Tuckey, which issued Nov. 2, 1993, illustrates and describes a turbine pump.

In FIG. 1, a filter fastening grommet 50 secures a flat fuel filter 52 on the flange around opening 28. The filter lies on the tank bottom below the raised bottom wall 26 of the housing 24. Openings 54 in the bottom of housing 24 admit fuel to the filter 52.

A sealing grommet 60 rests on the periphery of the flanged opening 28 and this grommet supports a base ring 62 of a jacket filter sleeve 64, which has a top ring 65. Vertical connectors, one of which 66 is shown, extend between the base ring 62 and the top ring 65. The filter jacket sleeve 64 extends between the base ring 62 and the top ring 65 and serves to filter fuel passing from the reservoir into the pump inlet. A pump base housing 68 (shown also in FIGS. 1 and 3) rests on the inner periphery of ring 62 and has an annular shoulder 69. The pump has a sealing jacket 70 spun in around an O-ring 72 at shoulder 69 on base 68, and sealed at the top 73 against a pump outlet housing 74. The pump outlet housing 74 has a pump outlet passage 76.

The pump within the jacket 70 has a turbine element 80 driven by a shaft 83 of an armature 84. Reference is made to U.S. Pat. No. 5,257,916 issued Nov. 2, 1993 for a full disclosure of a pump of the type shown in FIG. 1. A double ended sealing connector 90 inserts into pump outlet 76 at one end and into outlet fixture 40 at depending portion 42.

Figure 2A:
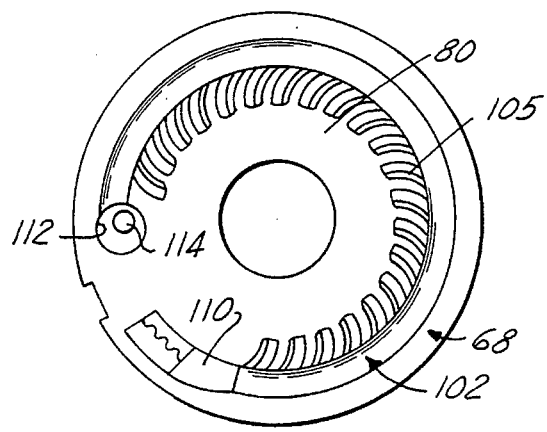
FIG. 2A is a section on line 2A—2A of FIG. 1 illustrating a lower pump plate.
Figure 2B:
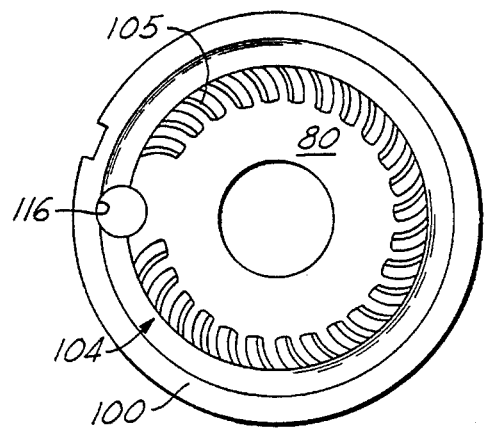
FIG. 2B is a mirror section of FIG. 2A on line 2B—2B of FIG. 1 illustrating the upper pump plate.
Figure 3:
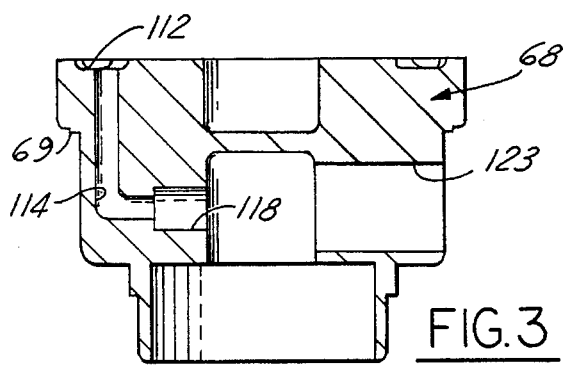
FIG. 3 is a section of the pump base.

The turbine element 80 rotates with its periphery moving in an annular pumping channel formed on one side by a top housing 100 and on the other side by an annular channel on the top surface of pump base housing 68. FIGS. 2A and 2B, taken on lines 2A—2A and 2B—2B of FIG. 1, show these respective channels 102 in housing 68 and 104 in housing 100. In each channel, a circumferential array of generally radially oriented grooves 105 are formed extending radially inward respectively from pumping channels 102 and 104 (FIGS. 2A and 2B). An inlet port 110 is provided in base 68 and a pump outlet port 112 in this base opens to a side jet by-pass passage 114 (FIG. 3). In top housing 100, a main pump outlet passage 116 opens to the armature chamber and to the main pump outlet 76.

In base housing 68, the passage 114 (FIG. 4) leads to an opening 118, in which is located a jet orifice 120 which discharges into a venturi tube 122 mounted in bore 123. A pump inlet chamber 124 has a one-way foot valve 126 which admits fuel from the filter at the base of the tank 24 to the venturi tube 122. The jet 120 and the venturi tube 122 are co-axial and parallel to the base of the fuel tank.

Figure 4:
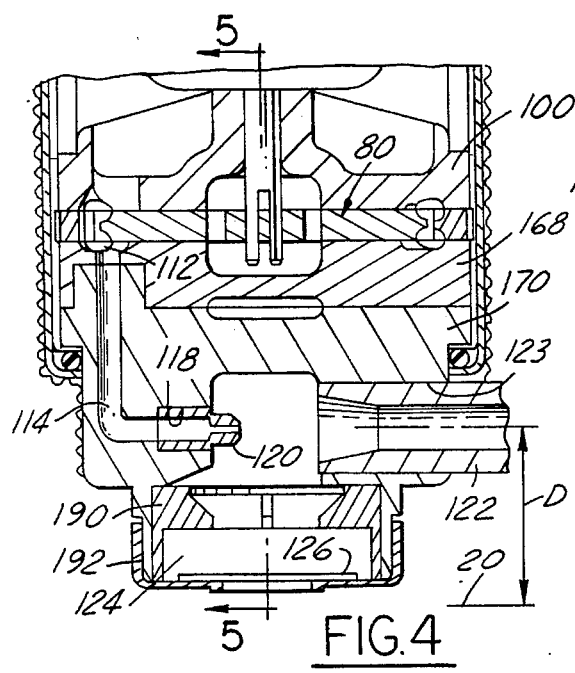
FIG. 4 is an enlarged sectional view of the pump base formed of two elements.
Figure 5:
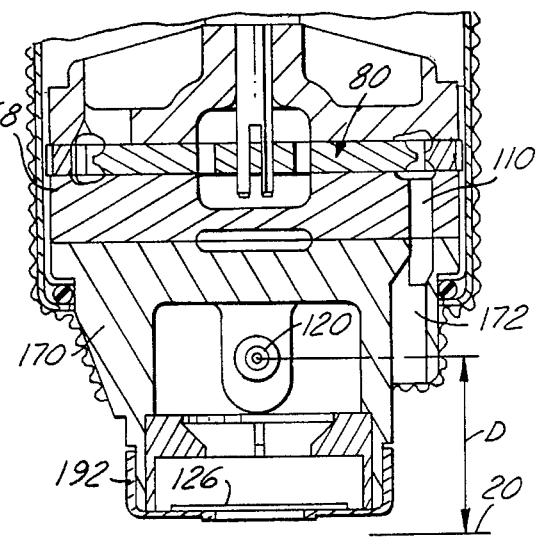
FIG. 5 is a section of the pump base, rotated from the showing in FIGS. 1 and 4, to show the turbine pump inlet.

In FIGS. 4 and 5, the base housing 68 of the pump, shown in FIG. 3, is formed of two plates 168 and 170. Otherwise, the effective base is the same. A pump inlet 110 aligns with an inlet passage 172 shown in FIG. 5 but this passage is the same in the one-piece base 68. The foot valve assembly is formed of a ring 190 retained by a flanged ring 192.

Figure 6:
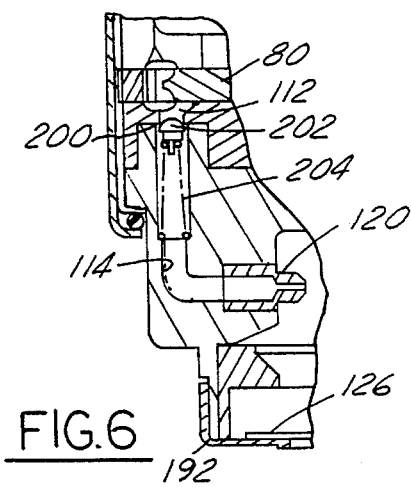
FIG. 6 illustrates a sectional view of the pump base of FIG. 1 with a delay check valve in the jet passage.

In FIG. 6, a modified structure is illustrated in which the jet fuel outlet 112 is formed with a valve seat 200. A domed check valve 202, backed by a coil spring 204, is positioned against the seat 200. The spring 204 is calibrated to a predetermined value so that it opens to furnish pump outlet fuel to the jet 120 only when that value is reached. This insures that, under conditions of low voltage and cold start-up, the fuel pump outlet fuel will reach the engine before the side jet starts to operate.

As shown in FIG. 1, the coaxial centerline of the venturi 122 as well as the jet 120 is located above the tank bottom 20 at a dimension D which can be about 0.650 of an inch or lower. The entire base construction of the pump assembly is designed to provide this low dimension D of the pump inlet 172 (FIG. 5). When a tank is almost completely emptied for lack of gasoline refill, the operator usually will obtain a gallon of gas at a station and empty it into the gas tank. This will provide a level in the bottom of the tank of about ¾" to 1". Thus, it is essential that fuel be available to the pump inlet to start the engine and enable the vehicle to reach a source of tank refill.

OPERATION

With the pump and in-tank reservoir assembly described, a turbine pump has a rotor operating in a channel at the periphery. The turbine pump is also associated with a side-jet outlet in which fuel from the turbine is directed to a main fuel outlet leading to the engine and a portion of the fuel is directed to the side jet which delivers to a venturi. The jet action pulls fuel from the main tank and delivers it to the reservoir.

Under low voltage-cold start conditions, the turbine pump 80 operating within the opposed channels in body 68 and top housing 100 will provide sufficient fuel to supply the engine as well as the side jet 120. This is true if each of the channels have the full circumferential array of radial grooves as viewed in FIGS. 2A and 2B.

If the turbine pump does not have the full circumferential array of radial grooves, as illustrated in U.S. Pat. No. 5,257,916, it may be desirable to interpose a pressure delay valve 202 between the pump outlet and the side jet as illustrated in FIG. 6. With this arrangement, the full fuel discharge of the pump goes directly to the engine. When the pressure reaches a predetermined value to overcome the spring 204 in FIG. 6, the fuel outlet from the pump will flow to the engine as well as to the side jet 120 and start filling the reservoir.

The filter jacket sleeve 64 surrounds the pump inlet 172 in FIG. 5 and filters fuel as it passes from the reservoir to the pump inlet.

What is claimed is:

1. An electric-motor fuel pump for installation in a vehicle fuel tank that comprises, a housing including a main fuel outlet and a main fuel inlet opening to the exterior of said housing immediately adjacent the bottom thereof and immediately adjacent the bottom of the fuel tank when installed therein, an electric motor in said housing and including a rotor and means for applying electrical energy to said motor to rotate said rotor in said housing, and a turbine pump in said housing and including an impeller coupled to said rotor for co-rotation therewith and having a periphery with a circumferential array of vanes, an arcuate pumping channel surrounding said impeller periphery and communicating with said main fuel outlet and a turbine pump fuel inlet coupled with said pumping channel and communicating with the exterior of said housing immediately adjacent the bottom thereof and being located immediately adjacent the bottom of the fuel tank when installed therein, said pump having a base housing which includes the main fuel inlet, a secondary fuel outlet in said base housing in communication with said pumping channel, a jet in said secondary fuel outlet, a venturi passage having an outlet end opening to the exterior of said housing and an inlet end axially opposed to said jet, said venturi passage being in communication with said main fuel inlet, whereby turbine pump outlet fuel in said secondary outlet discharging into said jet draws fuel into said venturi passage through said main inlet and discharges fuel from said venturi passage outlet end.

2. A fuel pump as defined in claim 1 in which there is provided a main fuel tank for a vehicle, a reservoir within said main fuel tank, said fuel pump being mounted on said base housing in said reservoir, said outlet end of said venturi passage being open to said reservoir, said turbine pump having a primary fuel outlet in communication with the interior of said reservoir, whereby fuel from said secondary outlet of said turbine pump passes through said jet into said venturi passage and draws fuel from said main inlet and moves it into said reservoir.

3. A fuel pump as defined in claim 1 in which said secondary fuel outlet in said base comprises an L-shaped passage having a first end at said pumping channel and a second end at said jet, said venturi passage in said base being axially aligned with said jet, said inlet end of said venturi passage being located above said main fuel inlet whereby fuel from said jet discharges into said inlet end of said venturi passage to draw fuel from said main inlet and move it through said venturi.

4. A fuel pump assembly as defined in claim 3 in which a foot valve in said base provides a one-way passage into said main fuel inlet.

5. A fuel pump as defined in claim 1 in which the turbine pump also comprises a circumferential array of generally radially oriented grooves on each side of said impeller, communicating with said pumping channel and extending generally radially inward of the periphery of said impeller.

6. An electric-motor fuel pump for installation in a fuel tank that comprises, a housing including a main fuel inlet and a fuel outlet, an electric motor including a rotor and means for applying electrical energy to said motor to rotate said rotor in said housing, and a turbine pump in said housing and including an impeller coupled to said rotor for co-rotation therewith and having a periphery with circumferential array of vanes, an arcuate pumping channel surrounding said impeller periphery and communicating with said fuel outlet and a turbine pump inlet coupled to said pumping channel and opening to the exterior of said housing immediately adjacent the bottom of said housing, said fuel pump having a base housing in which is formed the main fuel inlet, a secondary fuel outlet including an outlet passage in said base housing in communication with said pumping channel, a jet located in said secondary outlet passage, a biased valve in said outlet passage biased against flow from said pumping channel, a venturi passage in said base housing having an outlet end, and having an inlet end axially opposed to said jet, said venturi passage being in communication with said main fuel inlet, and means biasing said valve to allow flow to said outlet passage and said jet upon outlet pressure in said pumping channel reaching a predetermined value, whereby turbine pump outlet fuel in said secondary outlet passage discharging into said jet draws fuel into said venturi passage through said main fuel inlet and discharges fuel from said venturi passage outlet end.

7. A fuel pump assembly as defined in claim 6 in which said main fuel inlet is mounted in said base housing directly adjacent the bottom of said main fuel tank, and said jet and inlet end of said venturi passage are aligned substantially horizontally above said main fuel inlet, the axis of said jet and said venturi passage being positioned three quarters of an inch or less above the bottom of said main fuel tank.

8. A fuel pump as defined in claim 7 in which said base housing is comprised of a first pump channel plate positioned below said turbine pump impeller, and a second base plate subjacent said first plate having the secondary fuel outlet, said jet and said venturi passage formed therein.

9. A fuel pump assembly as defined in claim 7 in which a sock filter is located on the bottom of a fuel tank and having an outlet opening to said main fuel inlet.

10. A fuel pump assembly as defined in claim 9 in which said main fuel tank has a reservoir with a raised bottom wall above said sock filter, said bottom wall having an opening to receive and locate said pump base housing.

11. A fuel pump as defined in claim 6 in which said pump housing comprises a base inlet housing and a top outlet housing joined by a sealed encapsulating cylindrical shell, said main inlet being in said base housing, a cylindrical filter jacket surrounding said shell formed of fuel filter material and having a portion enclosing said turbine pump inlet in said base inlet housing to filter fuel flowing from said reservoir to said turbine pump inlet.

12. A fuel pump as defined in claim 6 in which the turbine pump also comprises a circumferential array of generally radially oriented grooves on each side of said impeller, communicating with said pumping channel and extending generally radially inward of the periphery of said impeller.

13. A fuel pump as defined in claim 6 in which said secondary fuel outlet in said base comprises an L-shaped passage having a first end at said pumping channel and a second end at said jet, said venturi passage in said base being axially aligned with said jet, said inlet end of said venturi passage being located above said main fuel inlet whereby fuel from said jet discharges into said inlet end of said venturi passage to draw fuel from said main inlet and move it through said venturi.

14. An electric motor fuel pump for installation in a vehicle fuel tank which comprises, a housing having a cylindrical shell, a first end cap received and carried by said shell adjacent one end thereof and having a fuel outlet, a second end cap carried by said shell adjacent the other end thereof and having a fuel inlet opening to the exterior of said housing immediately adjacent the bottom thereof and immediately adjacent the bottom of the fuel tank when the fuel pump is installed therein, an electric motor received in said housing and having a rotor journalled for rotation in said housing, a turbine pump in said housing and having an impeller coupled to said rotor for rotation therewith, an array of vanes circumferentially spaced apart about the periphery of said impeller, an arcuate pumping channel surrounding said impeller periphery, a first outlet coupled with said pumping channel and communicating with said main fuel outlet, a second outlet coupled with said pumping channel, an inlet coupled with said pumping channel and having an opening communicating with the exterior of said housing immediately adjacent the bottom thereof, and said inlet opening being located immediately adjacent the bottom of the fuel tank when the fuel pump is installed therein, a jet coupled to said secondary fuel outlet, and a venturi carried by said second cap and having an inlet end disposed generally axially downstream of said jet and communicating with said fuel inlet in said second end cap, and an outlet opening to the exterior of said housing immediately adjacent the bottom thereof and said outlet being located immediately adjacent the bottom of the fuel tank when the fuel pump is installed therein and spaced from said fuel inlet of said turbine pump.

15. A fuel pump assembly as defined in claim 14 wherein when said fuel pump is installed in a fuel tank, said opening of said inlet to said pump channel is within about 0.65 of an inch of the bottom of the tank.

* * * * *